United States Patent

[11] 3,610,827

[72] Inventor Walter H. Shaw
600 N.W. 196th St., Miami, Fla. 33169

[21] Appl. No. 816,738
[22] Filed Apr. 16, 1969
[45] Patented Oct. 5, 1971

[54] CONFERENCE CALL EQUIPMENT
10 Claims, 2 Drawing Figs.

[52] U.S. Cl. ........ 179/1 CN
[51] Int. Cl. ........ H04m 3/56
[50] Field of Search ........ 179/1 CN, 18.01

[56] References Cited

UNITED STATES PATENTS 3,264,411 8/1966 Reaves ........ 179/1

*Primary Examiner*—Kathleen H. Claffy
*Assistant Examiner*—Douglas W. Olms
*Attorney*—Whittemore, Hulbert & Belknap

ABSTRACT: Plural conference line connections are controlled at a conference-initiating handset through like, manual switch-controlled networks or subcircuits structurally adjacent but external of the set. Each network includes a diode-type bridge and associated diode-type gate, the firing of which, upon operation of one of plural switches for the respective networks sets up tip, ring and other terminal connections of the conference-initiating set's subcircuit. Each switch has normally open-latched and instantaneous contacts; and similar selective manipulation of other switches at the initiator's set, plus pushbutton selection of and dialing of conference line, routes the networks for conversation between any desired combination of conferees.

INVENTOR.
WALTER H. SHAW
BY
W. Rittemore, Hulbert & Belknap
ATTORNEYS

INVENTOR.
WALTER H. SHAW
BY
Whittemore, Hulbert & Belknap ATTORNEYS

CONFERENCE CALL EQUIPMENT

BACKGROUND OF THE INVENTION—FIELD

The invention relates to modern-day telephonic communication, in particular to the sector of that field concerned with a quick, easy, stable and foolproof establishment of conference calls as between an incoming or outgoing signal at a conference-originating phone set and one or more local or remote lines, also as between lines entirely local in respect to the originating line.

I am not aware of any pertinent prior art disclosures relating to equipment of the above-indicated general application which incorporates structural features such as are set forth in the Abstract and in the description to follow.

SUMMARY OF THE INVENTION

In accordance with the invention, an individual operating a conventional manual dial and selector button-type handset may quickly set up or selectively cancel out conference call connections between his own line and set and other lines of his system, as well as with more remote incoming and/or outgoing lines voice signal connects to that system. Each line of the system has a three-position manual control switch mounted by a separate switch box or pad at the conference-initiating set as part of the latter's line, these switches being wired into a corresponding number of separately housed control subcircuits at said set; and upon manipulation of any switch from its normally latched upon condition to a momentary contacting condition a shunt is established across the electrodes of a latch in type selenium rectifier of the conference-initiating network or subcircuit. This causes the rectifier to fire and energize a relay, thus to connect tip, ring and other transmitter-receiver terminals of the link through the agency of a diode-type bridge.

Having thus set up the network of his own master line, its user then selectively and similarly manipulates switches corresponding to any one or all of the remaining lines of the system for the desired conference connections, the respective switches being returned to normally open-latched condition upon the conclusion of participation of any or all conferees in the talk.

The circuitry of the system is very simple, inexpensive and stable in respect to voltage variables such as current and impedance changes otherwise apt to have an unbalancing effect. It requires a minimum of manual operations, to a great extent being independent of the pushbutton means of the handset, and the user may easily and quickly complete or cancel out, respectively, any of the desired or existing conference connections.

DESCRIPTION OF A PREFERRED EMBODIMENT

Figure 1:
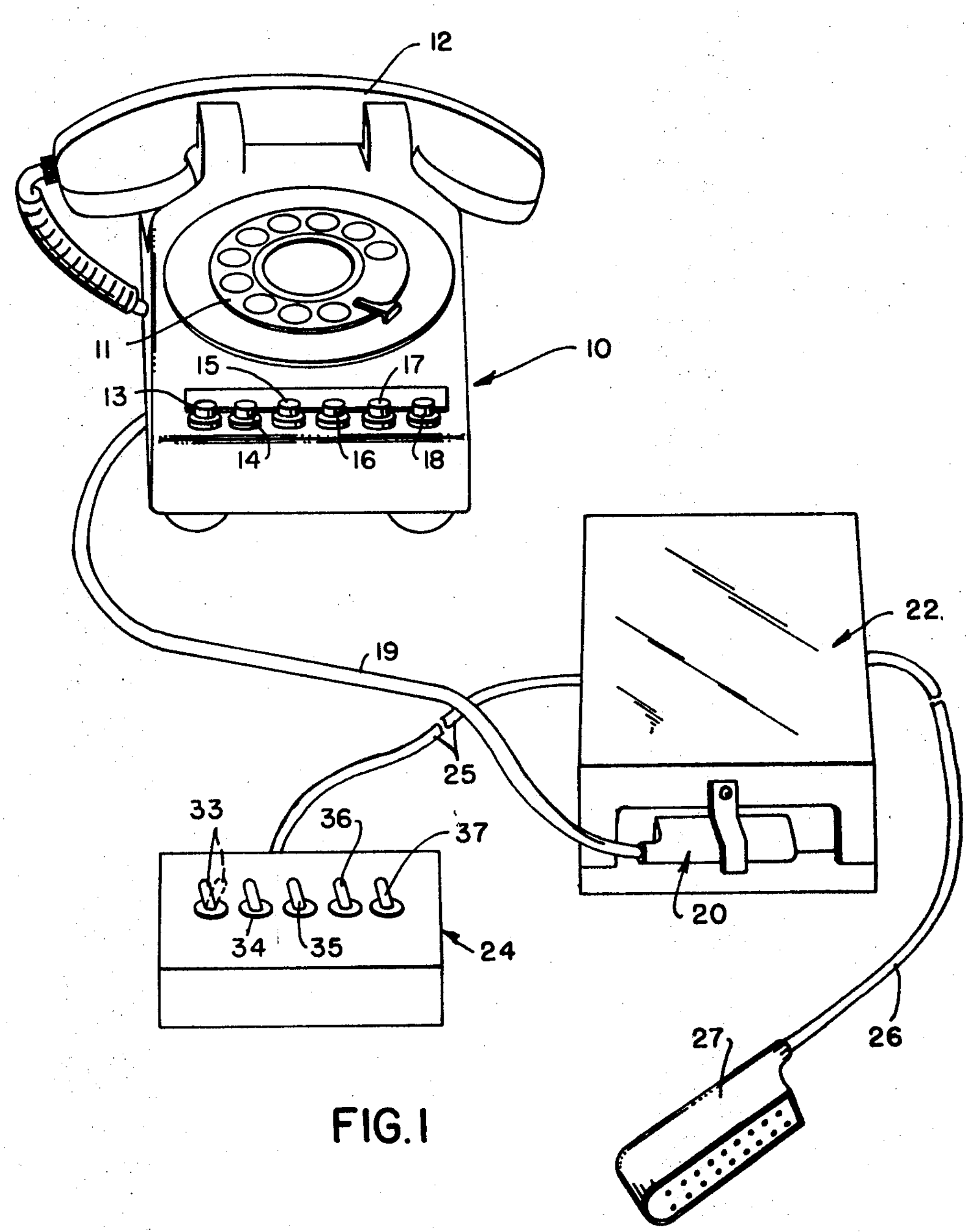
FIG. 1 is a perspective view, partially broken, illustrating a typical improved assemblage of components of the conference call subsystem or equipment of the invention, including a conventional dial pushbutton telephone set as plug-in connected to a boxed package of electrical components, this box being in turn connected electrically to a manual, three-position switch pad or box.

As shown FIG. 1, the conference call system or equipment of the invention comprises an entirely conventional and conventionally equipped manual dial and pushbutton type of telephone desk set 10, including a rotatable dial 11, cradled transmitter-receiver hand unit 12 and the usual set of manual pushbuttons. These include the usual "hold" button 13 and five line-selector buttons 14, 15, 16, 17 and 18. Set 10 conventionally includes an elongated four-lead conducting cable or cord 19 connected to a multiple pin plug-in connector 20, such as ordinarily would couple connections of the set to the installation's trunkline system. The connections of the leads of cord 19 for line $L_1$ are typically shown in dot-dash line FIG. 2. Connections for corresponding cords for the lines $L_2$–$L_5$ will be the same.

Connector 20 is shown in FIG. 1 as being plugged into a box 22 housing all of the tip and ring connected components and connections of the present equipment, save certain manually operated switch components which are housed in a small switch pad or box 24, which connects electrically to the box 22 through cable or cord means 25. The components in box 22 are connected by a cable 26 with a second conventional amphenol connector 27, which plugs onto the usual terminal box and console means (not shown) of the installation.

Figure 2:
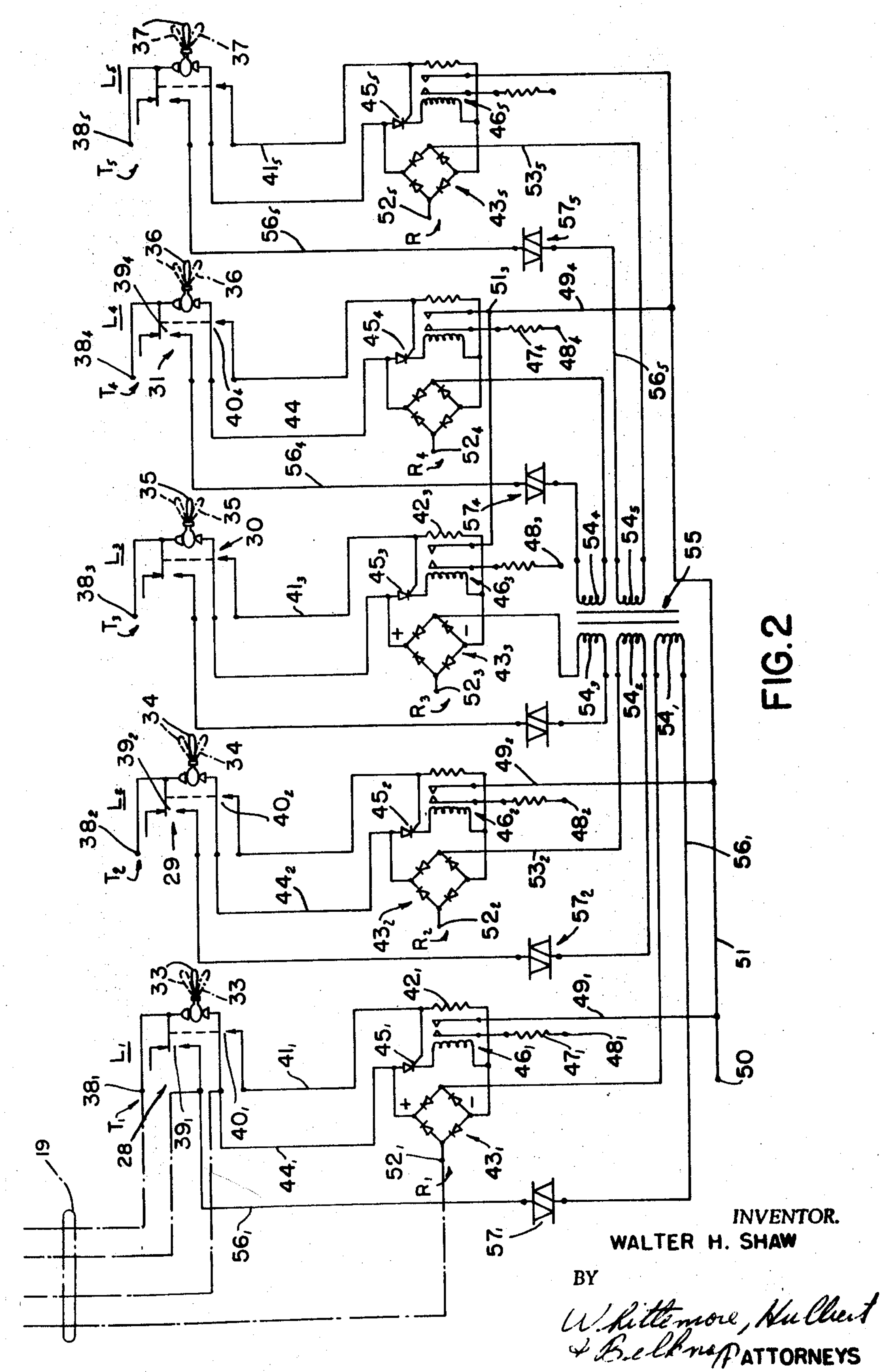
FIG. 2 is a schematic wiring diagram of electrical components and connections for five conference stations, as typically contemplated by the invention.

As depicted structurally and schematically, respectively, in FIGS. 1 and 2, the box 24 houses a number of three-position switches 28, 29, 30, 31 and 32 (FIG. 2) corresponding in number to the handset pushbuttons 14–18, and pivot-type operating fingerpieces 33–37, inclusive, of these respective switches are accessible at the top of box 24, all being shown in FIG. 1, in solid line in a leftwise position which represents a normal "off" position. They are shiftable from this position to an extreme right position (FIG. 1), in which momentary circuits are established selectively in the circuitry of FIG. 2 for the purpose to be described.

Referring to that figure, and illustratively in regard to a first line $L_1$ of the system, the reference numeral $\mathbf{38_1}$ denotes one terminal of the first three-position switch 28 which, as connected through cable 25 with a pin engaged by connector 20, represents the "Tip" connection $T_1$ of line $L_1$ . Accordingly, this connection $38_1$ is considered the tip terminal of line $L_1$, and similar tip terminals for lines $L_2$–$L_5$ inclusive, with appropriate subscripts, are designated $\mathbf{38_2}$–$\mathbf{38_5}$, inclusive. The same scheme of subscript notations applies to the identical components and circuit connections of the several lines $L_{1-5}$, as respectively controlled by the three-way switches 28–32, inclusive.

Switch 28 comprises a set of normally open contacts $\mathbf{39_1}$which are releasably latched in that condition when the fingerpiece 33 of the switch is in its clockwise-rotated position appearing in dot-dash line FIG. 2 (leftwise position of FIG. 1). When swung to its right-hand extreme (dotted line in FIGS. 1 and 2), switch 28 closes a momentary contact set $\mathbf{40_1}$ganged with the set $\mathbf{39_1}$. The fingerpiece 33 must be held in this position against spring return to a neutral switch position (solid line in FIG. 2) between the two extremes.

Thus the conference call originator completes a circuit through a line $\mathbf{41_1}$and a control resistor $\mathbf{42_1}$therein to the negative terminal of a diode-type bridge $\mathbf{43_1}$. The latter's positive terminal connects through a line $\mathbf{44_1}$ with the contactor of the contact set $\mathbf{40_1}$; and the line $\mathbf{44_1}$ also connects at a common terminal to the anode of a selenium rectifier gate diode $\mathbf{45_1}$. The cathode of this element is wired to the coil winding of a reed-type relay $\mathbf{46_1}$; and the contacts of this relay are respectively connected through a resistor $\mathbf{47_1}$ to a terminal $\mathbf{48_1}$ of the plug-in connector 27, and through a line $\mathbf{49_1}$ to another terminal 50 of that connector. This is a terminal common to the several lines $\mathbf{49_1}$–$\mathbf{49_5}$, which are schematically represented as being connected thereto through a buss conductor 51.

Diode bridge $\mathbf{43_1}$ is wired at an intermediate point to a terminal $\mathbf{52_1}$ which represents the "Ring" connection $R_1$of connector 27; while the opposite terminal of bridge $\mathbf{43_1}$ is connected by a lead $\mathbf{53_1}$ with one end of a coil winding $\mathbf{54_1}$ of a coupling transformer 55 of the system. This transformer couples together the lines $L_1$–$L_5$ of the system. Winding $\mathbf{54_1}$ is connected from its opposite end through a conductor $\mathbf{56_1}$ and a varistor $\mathbf{57_1}$ with a contact of the normally open set $\mathbf{39_1}$.

Accordingly, with the three-way switch 28 held in its dotted line position of FIG. 2, both the normally open contacts 39 and the momentary contacts $\mathbf{40_1}$ are closed, so that a shunt is placed across the anode and the cathode of diode $\mathbf{45_1}$. The latter consequently fires to complete a circuit through the coil of relay $\mathbf{46_1}$, this coil being connected to the negative terminal of diode bridge $43_1$, thence through a leg of the latter to the ring connection $R_1$ of line $L_1$. The intermediate bridge terminal opposite ring terminal $52_1$ is coupled through line $53_1$, transformer winding $54_1$ and varistor $57_1$ to complete a circuit through the closed contacts $39_1$ of switch 28, thus picking up the "Tip" $T_1$ of line $L_1$.

In the operation of the above subcircuit for line $L_1$ (and the same obtains in the identical and relatedly numbered subcircuit components of lines $L_2$–$L_5$), the resistor $42_1$ controls bias energy to maintain a good stability for the functioning of the gating diode $45_1$; and the contacts of relay $46_1$ furnish negative potential to hold operable the lamp relay of the telephone equipment, the resistor $47_1$ limiting energy across the relay contacts. Varistor $57_1$ operates to control any variance in line conditions in a very stable way; and the use of the selenium rectifier gate member $45_1$, as short-circuited by switch line $41_1$ to latch relay $46_1$ into the bridge connection, represents a desirably positive acting balance control by which the result of changes in current flow and impedance is effectively offset.

In the setting up of the various conference line subcircuits or networks controlled by the master switches 28–32, let it be assumed that an incoming or outgoing call is present on line $L_1$, which the individual operating desk set 10 wishes to convert into a conference call participated in by himself and, for example, an individual using line $L_3$. He will first depress the selected line button of set 10, thus connecting or answering the present call, then swing fingerpiece 33 of his switch pad 24 to the right (FIG. 1) or clockwise (FIG. 2) and momentarily hold it to establish his own tip-to-ring network or subcircuit. This places that line into a "busy" line or receiver off-hook condition. He next depresses the phone set pushbutton 16 for line $L_3$ and dials that line to bring the user thereof into conference by following the same procedure, whereupon all three parties may converse. The switches are now spring-urged in the center position to establish an automatic disconnect when the receivers are restored to the telephone cradles. The switch 28 of the conference originator's line and the switch 30 of the other conferee's line will be returned to the normally open, latched left-hand position when the call is completed as to all parties and they hang up. If it is to be terminated as to one or more of plural conferee lines before this, the same manipulation to the left is made of a switch corresponding to that line or lines. A similar sequence of wholly intrasystem conference lines may be set up in a similar way, in this case requiring no depression of a "Hold" button.

It is seen that the conference call system or equipment of the invention has great flexibility and versatility, being combined in an electrical installation which is very simple in regard to the nature and connections of its parts. The application of the connections of the multiple switch pad and the circuit network box to another, and the the handset, is carried out easily and quickly, with no need to modify trunkline console and other connections already in existence.

What is claimed is:

1. Circuitry for setting up conference call connections in a local telephone system between a telephone set at one receiver-transmitter line and one or more other receiver-transmitter lines locally or remotely related to said one line, comprising individual networks corresponding in number to the sum of said system lines, said one line having plural contact switches corresponding in number to said networks and operable in conjunction with said telephone set to selectively condition the latter and one or more of said other lines for conference communication, said networks each having means operatively coupling the same to one another, each of said networks comprising a bridge having a pair of intermediate terminals interposed between plus and minus polar terminals of the bridge, the bridge having a pair of arms connected in parallel with one another between said polar terminals and each such arm including a pair of and current flow-regulating devices connecting connected in series with one another at the respective intermediate terminals one of said intermediate terminals being connected to said coupling means and the other intermediate terminal being connected to a contact of a contact switch, an electrical gate member having a pair of terminals, other contacts of the same contact switch being respectively connected to the plus polar terminal of the bridge and a first terminal of said gate member, and to a second terminal of the latter, and relay means energized upon closure of said other switch contacts, said relay means being connected by said gate member between said polar terminals of said bridge.

2. Circuitry call connections in a local telephone system between in accordance with claim 1, in which said networks are coupled inductively to one another by said coupling means and said bridge devices are diodes, said electrical gate member being a diode rectifier type fired upon closure of said other contacts, said relay means comprising a reed-type relay energized upon firing of said gate member 3. The circuitry of claim 2, in which said switches of said one line each include normally open contacts and instantaneous contacts, the latter of which govern said firing of said gate member.

4. The circuitry of claim 3, in which said switches are spring-biased against closure of said instantaneous contacts and are releasably latched in the normal opening condition of the first-named contacts.

5. A conference call system having circuitry in accordance with claim 1, in which individual conference transmitting and receiving line hookups are established under a common type of switch control means, and further comprising circuit connections in the switch control means of each of said networks completing a talking hookup therethrough upon energization of the respective relays, the common-type switch control comprising a set of switches individually governing the setting-up and operation of the respective networks.

6. A conference call system having circuitry in accordance with claim 2, in which individual conference transmitting and receiving line hookups are established under a common type of switch control means, and further comprising circuit connections in the switch control means of each of said networks completing a talking hookup therethrough upon energization of the respective relays, the common-type switch control comprising a set of switches individually governing the setting-up and operation of the respective networks.

7. The system of claim 5, and further comprising, in each network, a voltage regulating, varistor-type member connected between the inductive coupling of the network and said common switch control means.

8. The circuitry of claim 5, and further comprising control resistor or like means connected between the respectively connected terminals of said relay and bridge of the network.

9. The system of claim 6, and further comprising control resistor or like means connected in each network between the respectively connected terminals of said relay and bridge.

10. The system of claim 7, and further comprising control resistor or like means connected in each network between the respectively connected terminals of said relay and bridge.

UNITED STATES PATENT OFFICE
CERTIFICATE OF CORRECTION

Patent No. 3,610,827 Dated October 5, 1971

Inventor(x) Walter H. Shaw

It is certified that error appears in the above-identified patent and that said Letters Patent are hereby corrected as shown below:

Column 1, line 14, "incorporates" should be --incorporate-- (application, page 1, last line);

Column 1, line 34, "link" should be --line-- (application, page 2, line 19);

Column 2, line 3, before "FIG. 2" "in" should be inserted. (application, page 3, line 23);

Column 2, line 42, "in" should be inserted before "FIG. 2". (application, page 5, line 11);

Column 3, line 52, after "and", cancel "the" and substitute --to--. (application, page 8, line 16);

Column 4, line 19, in Claim 2, after "Circuitry", cancel "call connections in a local telephone system"; line 20, cancel "between". (application, Claim 2, (twice amended);

Column 4, line 56, in Claim 8, change "5" to --1--. (Claim 9 (amended), line 1 of application).

Signed and sealed this 4th day of April 1972.

(SEAL)
Attest:

EDWARD M.FLETCHER,JR.
Attesting Officer

ROBERT GOTTSCHALK
Commissioner of Patents

USCOMM-DC 60376-P69
☆ U.S. GOVERNMENT PRINTING OFFICE : 1969 O—366-334